United States Patent
Doemens et al.

(10) Patent No.: US 6,791,698 B2
(45) Date of Patent: Sep. 14, 2004

(54) CONFOCAL IMAGING SYSTEM HAVING A DIVIDED RETROREFLECTOR

(75) Inventors: Guenter Doemens, Holzkirchen (DE); Anton Schick, Velden (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/332,849

(22) PCT Filed: Jul. 10, 2001

(86) PCT No.: PCT/DE01/02573
§ 371 (c)(1),
(2), (4) Date: Jan. 14, 2003

(87) PCT Pub. No.: WO02/08688
PCT Pub. Date: Jan. 31, 2002

(65) Prior Publication Data
US 2004/0080760 A1 Apr. 29, 2004

(30) Foreign Application Priority Data
Jul. 14, 2000 (DE) .......................... 100 34 250

(51) Int. Cl.$^7$ .............................................. G01B 11/00
(52) U.S. Cl. .................. 356/614; 250/231.16; 359/578
(58) Field of Search ........................ 356/614, 622–624, 356/28–28.5, 3.16, 4.05–4.06; 250/231.16, 237 G, 231 SE; 359/577–578, 615, 161

(56) References Cited

U.S. PATENT DOCUMENTS

| | | | | |
|---|---|---|---|---|
| 4,632,548 A | * | 12/1986 | Gunter et al. | 356/28.5 |
| 4,975,571 A | * | 12/1990 | McMurtry et al. | 250/231.16 |
| 5,030,710 A | * | 7/1991 | Speranza et al. | 528/324 |
| 5,589,936 A | * | 12/1996 | Uchikawa et al. | 356/450 |
| 5,936,728 A | * | 8/1999 | Bouzid | 356/318 |
| 5,991,040 A | * | 11/1999 | Doemens et al. | 356/614 |
| 6,327,038 B1 | * | 12/2001 | Maxey | 356/508 |
| 6,392,807 B1 | * | 5/2002 | Barbarossa et al. | 359/578 |

FOREIGN PATENT DOCUMENTS

| | | |
|---|---|---|
| DE | 19608468 | 9/1997 |
| DE | 19837249 | 2/2000 |

\* cited by examiner

Primary Examiner—Frank G. Font
Assistant Examiner—Sang H. Nguyen
(74) Attorney, Agent, or Firm—Harness, Dickey & Pierce, P.L.C.

(57) ABSTRACT

A confocal imaging system is equipped with a retroreflector, which oscillates with a high frequency, for increasing the data rate during the recording of distance values. A mirror system having a small mass is provided that, by use of an electrostatic drive, makes extremely rapid focusing movements or height detections possible in the case of a small mass. The mirror system includes two separate micromechanically produced mirrors, which are set at 90° to one another and which synchronously oscillate in the direction of the optical axis of the confocal imaging system.

43 Claims, 1 Drawing Sheet

Electrostatically deflected micromirror (resonance)

Electrostatically deflected micromirror (resonance)

CONFOCAL IMAGING SYSTEM HAVING A DIVIDED RETROREFLECTOR

This application is the national phase under 35 U.S.C. §371 of PCT International Application No. PCT/DE01/02573 which has an International filing date of Jul. 10, 2001, which designated the United States of America and which claims priority on German Patent Application number DE 100 34 250.7 filed Jul. 14, 2000, the entire contents of which are hereby incorporated herein by reference.

FIELD OF THE INVENTION

The invention generally relates to a confocal imaging system, preferably for the generation of height values or height images.

BACKGROUND OF THE INVENTION

Height images can be recorded in the microscopic range by using confocal microscopy. In order to carry out the variation of the optical path length necessary for this, according to the prior art the front objective is moved to and fro in the direction of the optical path length. The data rate which can be achieved in this case, however, is restricted to a few 100 Hz.

Patent Specification DE 196 08 468 C2 discloses a system in which the variation of the optical path distance is varied on the image side through the oscillation of a receiver or of an interposed deviating mirror. With the use of a deviating reflector, the mass to be moved is reduced to a few milligrams and the deflection is simultaneously doubled. In comparison with the oscillation of a front objective, it is thereby possible to achieve data rates which are about ten times higher. The oscillation movement is brought about through an electromagnetically driven resonance oscillator. In conjunction with a parallel layout of the overall confocal system, for example 32 times, data rates of up to 200 kHz are thereby achieved.

A substantially higher data rate is required in many industrial applications. This is true, in particular, of automatic inspection in electronics fabrication. The extent to which an electromagnetically drivable oscillator at about 2 kHz can provide a sufficient data rate is therefore crucial.

A problem with the described system involves the strong sound emission. This is scarcely avoidable in the case of electromagnetic drives at the amplitudes and frequencies still necessary here.

SUMMARY OF THE INVENTION

It is an object of an embodiment of the invention to optimize confocal imaging systems with respect to their data rate and reliability.

The discovery of an embodiment of the invention involves separating the mutually connected mirrors used previously, so as to provide separate micromirrors which are likewise set at 90° with respect to one another. Embodiment as micromirrors reduces the mass to be set in oscillation. The drive may be electrostatic. The achievable frequencies are substantially higher than according to the prior art, for example 10 kHz or higher.

The micromirrors are preferably formed integrally in silicon together with a spring suspension. Besides the relatively low oscillation energy in combination with the smaller surface areas, the sound emission is substantially reduced. Crystalline silicon furthermore constitutes an ideal spring material. The life of the mechanical oscillator can thereby be extended significantly in comparison with electromagnetic drives, and the hysteresis of the displacement/time response is substantially improved.

BRIEF DESCRIPTION OF THE DRAWINGS

An exemplary embodiment will be described below with reference to schematic figures.

DETAILED DESCRIPTION OF THE PREFERRED EMBODIMENTS

Figure 1:
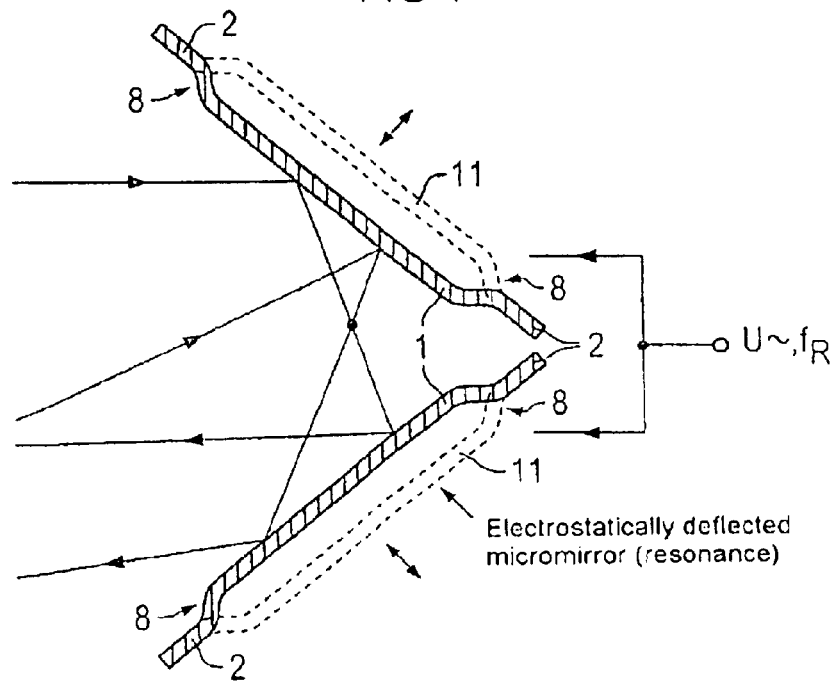
FIG. 1 schematically shows a deviating reflector with mirrors set at 90° with respect to one another.

FIG. 1 schematically represents a variable deviating reflector including micromechanically produced micromirrors 1, 11. The mode of operation of the micromirrors corresponds to the previously known mode of operation, by rotating or setting the mirrors by 90° with respect to one another and placing them in the beam path of the confocal imaging system. The two mirrors 1, 11 oscillate synchronously. The mirrors preferably oscillate at their resonant frequency $f_R$. The driving of these mirrors is carried out electrostatically. The double arrow indicated in FIG. 1 denotes the oscillation direction. The common voltage U~ is used for actuating both the mirrors. In order to be able to achieve particularly high amplitudes, the micromirror system may also be operated under a vacuum with increased operating voltages, or at a reduced pressure. In this case, it is possible to use higher voltages and higher field strengths.

Figure 2:
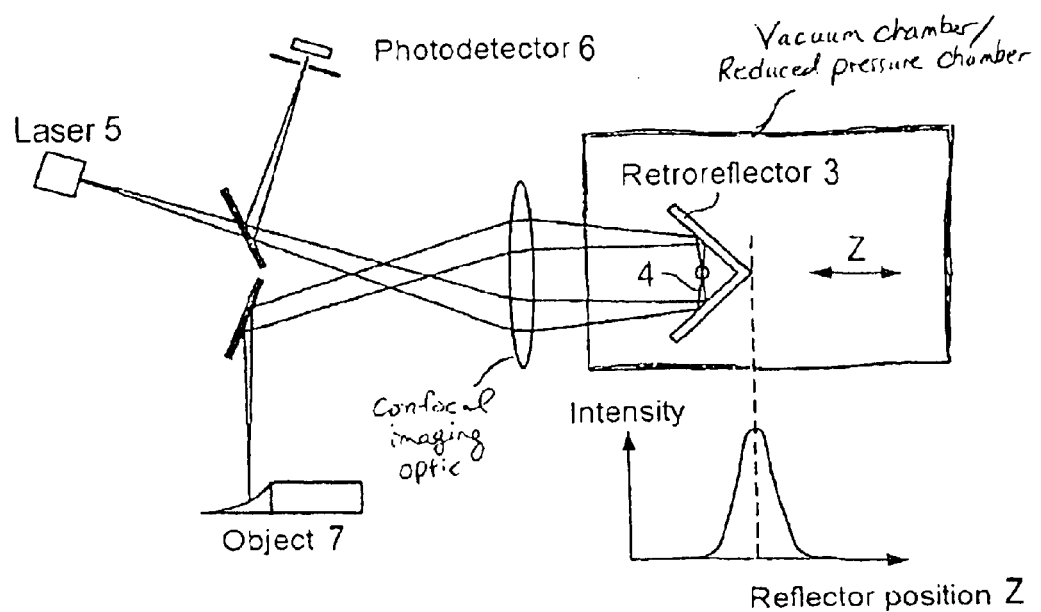
FIG. 2 shows the overall beam path of a confocal microscope with variation of the image distance through the moved reflector.

FIG. 2 represents the overall confocal imaging system with a retroreflector 3 oscillating in the z direction. FIG. 2 further illustrates the system containing mirrors 1, 11, and spring elements 8 between the mirrors and a support 2. The mirrors are preferably micromirrors formed integrally in silicon together with a spring suspension. The system comprising micromirrors may be used as the retroreflector 3. The retroreflector 3 can be operated in a vacuum or at a reduced pressure as shown. FIG. 2 represents a laser 5 whose beams are guided via the confocal imaging system. The system is confocal since the illumination source as well as the photodetector 6 are designed with the point format. The beam path of the confocal imaging system is designed so that it is reflected back by a retroreflector 3 while being shifted by 180°.

The oscillation of the retroreflector 3 takes place in the direction of the optical axis of the system at this position. The illumination beam and the measurement beam are guided substantially through the same optics. The measurement beam reflected back by the object, however, is diverted by use of a splitter mirror onto a photodetector 6 before it strikes the laser 5.

In the retroreflector 3, i.e. the key element in this imaging system, a real intermediate image of the point light source is formed between the mirrors. By moving the mirror system in the direction of the optical axis, the intermediate image between the mirrors is moved and consequently the focus in the object region is also moved. The light scattered by the object travels through the beam path in the opposite direction relative to the illumination beam, and is finally focused onto a point detector, i.e. the photodetector 6. The overall configuration of the arrangement can be designed so that the mirror system with low mass can be moved by means of an oscillator at high speed, and extremely fast focal movements or height detections can accordingly be recorded.

Uses of this system are found in medical technology, for example for recording skin regions at differing depth. The depth depends on the capacity for penetration into the top layers of the skin of the light which is used. The high data rate permits in-vivo representation of the skin regions. A further application field, for example, involves the determination of three-dimensional surface data in industrial fabrication. Particular examples are the semiconductor connection and assembly fields and module fabrication. In this case, the objects being tested are generally three-dimensional in nature. For example, the shape and height of solder bumps are tested. These are important process parameters in particular for flip chip assembly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A confocal imaging system, comprising:
    confocal imaging optics for imaging a focal point on an object;
    an illumination unit for illuminating the object using the confocal imaging optics;
    a photodetector for detecting the light back-scattered by the object and for optoelectrically converting the detected light; and
    a retroreflector, including at least two micromirrors set by 90° with respect to one another and which oscillate synchronously with one another, located in the optical beam path and adapted to oscillate in the direction of the optical axis in order to move the focal point in the direction of the optical axis,
    wherein the micromirrors are made integrally of silicon in the form of an arrangement and include mirrors and spring elements between the mirrors and a support.

2. The confocal imaging system as claimed in claim 1, wherein the micromirror arrangement consists of crystalline silicon.

3. The confocal imaging system as claimed in claim 2, wherein the micromirrors oscillate in resonance.

4. The confocal imaging system as claimed in claim 2, wherein the micromirror arrangement is electrostatically drivable.

5. The confocal imaging system as claimed in claim 2, wherein the micromirror arrangement is adapted to be operated in at least one of a vacuum and at a reduced pressure.

6. The confocal imaging system a claimed in claim 1, wherein the micromirrors oscillate in resonance.

7. The confocal imaging system as claimed in claim 6, wherein the micromirror arrangement is electrostatically drivable.

8. The confocal imaging system as claimed in claim 6, wherein the micromirror arrangement is adapted to be operated in at least one of a vacuum and at a reduced pressure.

9. The confocal imaging system as claimed in claim 1, wherein the micromirror arrangement electrostatically drivable.

10. The confocal imaging system as claimed in claim 9, wherein the micromirror arrangement is adapted to be operated in at least one of a vacuum and at a reduced pressure.

11. The confocal imaging system as claimed in claim 1, wherein the micromirror arrangement is adapted to be operated in at least one of a vacuum and at a reduced pressure.

12. The confocal imaging system as claimed in claim 1, wherein the micromirror arrangement includes crystalline silicon.

13. The confocal imaging system as claimed in claim 12, wherein the micromirrors oscillate in resonance.

14. The confocal imaging system as claimed in claim 12, wherein the micromirror arrangement is electrostatically drivable.

15. The confocal imaging system as claimed in claim 12, wherein the micromirror arrangement is adapted to be operated in at least one of a vacuum and at a reduced pressure.

16. The confocal imaging system of claim 1, wherein the illumination unit includes a laser.

17. A confocal imaging system of claim 1, wherein the micromirrors include integrally formed mirrors and spring elements.

18. A confocal imaging system, comprising:
    confocal imaging optics means for imaging a focal point on an object;
    illumination means for illuminating the object using the confocal imaging optics;
    photodetector means for detecting light from the illuminated object; and
    means, including at least two micromirrors set at 90° with respect to one another and located in the optical beam path, for oscillating the micromirrors synchronously with one another in the direction of the optical axis in order to move the focal point in the direction of the optical axis,
    wherein the micromirrors include silicon and include mirrors and spring elements between the mirrors.

19. The confocal imaging system as claimed in claim 18, wherein the micromirrors include crystalline silicon.

20. The confocal imaging system as claimed in claim 18, wherein the micromirrors oscillate in resonance.

21. The confocal imaging system as claimed in claim 18, wherein the means for oscillating is electrostatically drivable.

22. The confocal imaging system as claimed in claim 18, wherein the means for oscillating is adapted to be operated in at least one of a vacuum and at a reduced pressure.

23. The confocal imaging system of claim 18, wherein the illumination means includes a laser.

24. The confocal imaging system as claimed in claim 18, wherein the means for oscillating includes a retroreflector.

25. A confocal imaging system of claim 18, wherein the micromirrors include integrally formed mirrors and spring elements.

26. A confocal imaging system, comprising:
    confocal imaging optics, adapted to image a focal point on an object; and
    at least two micromirrors, angled 90° with respect to one another, located in an optical beam path and adapted to oscillate synchronously in the direction of an optical axis to move the focal point in the direction of the optical axis,
    wherein the micromirrors include silicon and include mirrors and spring elements between the mirrors.

27. The confocal imaging system as claimed in claim 26, wherein the micromirrors include crystalline silicon.

28. The confocal imaging system as claimed in claim 26, wherein the micromirrors are adapted to oscillate in resonance.

29. The confocal imaging system as claimed in claim 26, wherein the micromirrors are electrostatically drivable.

30. The confocal imaging system as claimed in claim 26, wherein the micromirrors are adapted to be operated in at least one of a vacuum and at a reduced pressure.

31. The confocal imaging system as claimed in claim 26, wherein the micromirrors form a retroreflector.

32. The confocal imaging system of claim 26, further comprising:
an illumination unit, adapted to illuminate the object using the confocal imaging optics; and
a photodetector, adapted to detect light from the illuminated object.

33. The confocal imaging system of claim 32, wherein the illumination unit includes a laser.

34. A confocal imaging system of claim 26, wherein the micromirrors include integrally formed mirrors and springs elements.

35. A micromirror arrangement for use in a confocal imaging system including confocal imaging optics adapted to image a focal point on an object, the micromirror arrangement comprising:
at least two micromirrors, angled 90° with respect to one another, located in the optical beam path and adapted to oscillate synchronously in the direction of the optical axis to move the focal point in the direction of the optical axis,
wherein the micromirrors include silicon and include mirrors and spring elements between the mirrors.

36. The micromirror arrangement of claim 35, wherein the micromirrors include crystalline silicon.

37. The micromirror arrangement of claim 35, wherein the micromirrors are adapted to oscillate in resonance.

38. The micromirror arrangement of claim 35, wherein the micromirrors are electrostatically drivable.

39. The micromirror arrangement of claim 35, wherein the micromirrors are adapted to be operated in at least one of a vacuum and at a reduced pressure.

40. The micromirror arrangement of claim 35, wherein the micromirrors form a retroreflector.

41. The micromirror arrangement of claim 35, wherein the confocal imaging system further includes an illumination unit, adapted to illuminate the object using the confocal imaging optics; and a photodetector, adapted to detect light from the illuminated object.

42. The micromirror arrangement of claim 41, wherein the illumination unit includes a laser.

43. A micromirror arrangement of claim 35, wherein the micromirrors include integrally formed mirrors and spring elements.

* * * * *